(12) United States Patent
Kim

(10) Patent No.: US 8,387,307 B2
(45) Date of Patent: Mar. 5, 2013

(54) VEGETATION BASE SOIL AND A METHOD FOR GROWING VEGETATION ON A SLOPED SURFACE

(76) Inventor: Young Koo Kim, Seoul (KR)

( * ) Notice: Subject to any disclaimer, the term of this patent is extended or adjusted under 35 U.S.C. 154(b) by 200 days.

(21) Appl. No.: 12/659,778

(22) Filed: Mar. 22, 2010

(65) Prior Publication Data

US 2011/0226169 A1 Sep. 22, 2011

(51) Int. Cl.
*A01B 79/00* (2006.01)
*A01B 79/02* (2006.01)
*A01C 1/00* (2006.01)
*A01G 1/00* (2006.01)
*A01G 17/00* (2006.01)

(52) U.S. Cl. ............. 47/1.01 T; 47/58.1 R; 47/58.1 SC; 47/58.1 SE; 47/904; 405/15; 405/270; 405/302.7; 111/900; 111/200

(58) Field of Classification Search ............... 47/1.01 R, 47/1.01 F, 1.01 T, 58.1 R, 58.1 SC, 58.1 SE, 47/904; 405/15, 258.1, 270, 302.3, 302.4, 405/302.6, 302.7; 111/900, 200
See application file for complete search history.

(56) References Cited

U.S. PATENT DOCUMENTS

| 5,607,494 | A | | 3/1997 | Kim |
| 5,662,744 | A | | 9/1997 | Tuller et al. |
| 6,012,251 | A | * | 1/2000 | Siegert ........................ 47/59 R |
| 2008/0317553 | A1 | * | 12/2008 | Kugler et al. .............. 405/129.1 |
| 2009/0038216 | A1 | * | 2/2009 | Kim ........................ 47/58.1 SC |

FOREIGN PATENT DOCUMENTS

JP 2001120067 A * 5/2001

* cited by examiner

*Primary Examiner* — Christopher J. Novosad
(74) *Attorney, Agent, or Firm* — Jacobson Holman PLLC (57) ABSTRACT

Slope surfaces of land can be eroded by rain and wind. It is necessary to vegetate a bared slope surface of land for the purpose of erosion control and environmental conservation. The present invention provides a vegetation base soil composition and a method of growing vegetation on a sloped surface for erosion control and vegetating on cut rock slope surface, such as weathered rock surface and barren soil surface. The vegetation base soil includes peat, bio-solids formed by the treatment of urban sewage, for example water treatment plant sediment, woodchip, bark, animal waste compost and clay or loam. The vegetation base soil with a microbes active material, a root activation fertilizer, an adhesive material and seeds are applied over a mesh that is secured over the sloped surface. Plants are grown in the layer of vegetation base soil.

5 Claims, 2 Drawing Sheets

VEGETATION BASE SOIL AND A METHOD FOR GROWING VEGETATION ON A SLOPED SURFACE

BACKGROUND OF THE INVENTION

1. Field of the Invention

The present invention relates to a vegetation base soil composition for erosion protection (erosion control) against sediment runoff from a slope surface of land and a method for growing vegetation on a sloped surface, such as a slope with barren soil, weathered rocks or cut rocks, that is a poor environment for plants.

2. Description of Related Art

Land can be developed for national prosperity and improving human quality of life. After development, spoiled slopes of land are usually formed. Land may also be spoiled by natural impact. These spoiled slope surfaces are plantless areas that are susceptible to erosion by wind and rain. The erosion causes more land spoil, blocks and contaminates rivers, and leads to drought or desertification. Therefore, these barren slope surfaces must be protected from erosion and be vegetated. U.S. Pat. Nos. 5,607,494 and 5,662,744 provide an artificial soil composition and a method of growing vegetation on a sloped surface, especially a cut rock surface. However, these surfaces are a very poor environment for plants to survive and grow. If the slope soil condition is relatively acceptable, hydro-seeding can be applied. However, if the soil condition is not suitable for hydro-seeding, a special method for vegetation becomes necessary.

SUMMARY OF THE INVENTION

Slope surfaces of land can be eroded by rain and wind. It is necessary to prevent sediment runoff from slope surfaces. To grow plants on these slope surfaces, the slopes must be stable. Thus, it is necessary to firstly stabilize the slope's background, and then attach vegetation base soil. Otherwise, the plant's root will be easily removed and the plant will wither and die. The moisture and fertilizer are essential for plants to survive and grow, but they do not exist on the barren slopes. Therefore, vegetation base soil compost must retain moisture and fertilizer for a long time so that they can recycle themselves. The base soil compost has to have improved adhesion for stabilization against to rainfall. After slope surfaces are covered by vegetation, there will be no sediment runoff from these slope surfaces.

The present invention provides the following methods to achieve the above referenced objectives.

(1) producing vegetation base soil compost to achieve above objective;
(2) mixing about 5 to 30% weight percent of peat, about 10 to 35% weight percent of animal waste, about 10 to 39% weight percentage of a sludge cake compost; about 10 to 30% weight percent of a wood chip compost; about 5 to 20% weight percent of bark compost; and about 5 to 25% percent by weight of clay or loam;
(3) installing mesh and fixing it with anchor sticks at an indicated interval to stabilize slopes with vegetation base soil compost;
(4) laying and fixing fiber ropes at every 1~2 m interval along the horizontal direction on the slopes to aid moisture retention and also at every 1~2 m interval along the vertical direction;
(5) mixing a soil microbes activator with a root growth activator, an adhesive material, seeds that are suitable to the local climate, and clean water with the vegetation base soil; and spraying the mixture onto the mesh;
(6) when the total thickness is thicker than 2 inches, spraying the mixture in multi-layers to prevent vegetation base soil from sliding down in these situations; spraying the vegetation base soil with the adhesive material in the bottom layer; spraying the vegetation base soil with the microbes activator, the root growth activator, and the adhesive material in the under-top layer; spraying the vegetation base soil with the adhesive material and seeds in the top layer, all these materials being mixed with a moderate ratio of clean water;
(7) when the slope is steeper than 45 degree from a horizontal surface and the layer is thicker than 4 inches in total, installing a fiber net on the 4-inch layer and then spraying the top layer.

According to the present invention, the vegetation base soil is shown to have an increased adhesion to the inclined surface compared to existing artificial soil. The vegetation base soil of the present invention also promotes plants growth through the microbes activation and retains water to a greater extent than existing artificial soil. Further, the vegetation base soil of the present invention does not cause an environmental hazard resulting from the leaching of compounds in the run-off water.

BRIEF DESCRIPTION OF THE DRAWINGS

The accompanying drawings, which are included to provide a further understanding of the invention and are incorporated and constitute a part of this specification, illustrate embodiments of the invention and together with the description serve to explain the principles of the invention. In the drawings:

Referring to FIG. 4, reference numeral 2 denotes an area to which the tree seeds are dispersed, reference numeral 3 denotes a part of the seed mixture layer 50 of artificial soil, reference numeral 4 denotes grass, weed, and tree, and reference numeral 5 denotes an area where a plan for growing vegetation has been implemented.

DETAILED DESCRIPTION OF THE INVENTION

Reference will now be made in detail to the preferred embodiments of the present disclosure, examples of which are illustrated in the accompanying drawings.

A vegetation base soil and a method for growing vegetation on a sloped surface using the same according to the present invention will be explained in more detail. The vegetation base soil according to the present invention is produced by mixing peat in a concentration range of between about 5 to 30% by weight, fermented bio-solids compost in a concentration range of between about 10 to 39%, a fermented water treatment sediment in a concentration range of between about 10 to 30% by weight, a fermented animal waste in a concentration range of between about 10 to 35% by weight, a compost wood chip compost in a concentration range of between about 10 to 30% by weight, a bark compost in a concentration range of between about 5 to 20% by weight, clay or loam in a concentration range of between about 5 to 25% by weight.

The peat is partially carbonized vegetation that belongs to the group of plants that grow on moisture land. Accordingly, in a hot and dry area, the peat erodes as organic matter is decomposed; whereas in a cold area with moist winters, the peat is in a slow decomposition process or does not decompose at all. The peat has a high nutrient-retaining capability and moisture-retaining capability, and is not secondarily fermented, thereby not causing damage to plants but beneficial to the plants.

Table 1 shows an analysis for components of peat

| pH | OM % | $P_2O_5$ (ppm) | Ca % | Mg % | K % | Na % | T-N (%) |
|---|---|---|---|---|---|---|---|
| 6.5 | 39 | 284 | 9.8 | 2.3 | 0.35 | 0.13 | 1.26 |

A pH of a soil suitable for a plant growth is in a range of 6~7.5 and a pH of the peat is 6.8, which is suitable for plant growth.

The peat has an organic matter (OM) in a concentration of 39% by weight which is beneficial to a plant growth. Generally, soil having $P_2O_5$ of 200 ppm or more is classified as soil with a high level of organic matter, and soil having able $P_2O_5$ of 200 ppm=300 ppm is classified as soil with into a middle level of organic matter. The peat has $P_2O_5$ of 284 ppm, which is suitable for plant growth. In addition, the peat has a good moisture retaining capability.

During sewage treatment, bacteria and other microorganisms break down components in waste water into simpler and more stable forms of organic matter. Non-organic matter also settles into sludge. For instance, a tiny amount of heavy metals and other potentially toxic materials, including flame retardants (PBDEs) and organic pollutants, are commonly found in sewage sludge in part per million (ppm) levels. What does not settle into sludge leaves the treatment facility as a treated waste water effluent. Bio-solids in their liquid form look like muddy water and contain 1-10% solids. Bio-solids may be dewatered in a second step of the treatment process, which turn into sludge cake with the texture of a wet sponge.

This sludge cake can be fermented with microbes. The fermented sludge cake referred to herein is the precipitate formed in the neutralization process during sewage treatment and contains predominantly organic matter. For example, the sludge cake can be obtained from urban sewage treatment plants. The de-watered sediment is a suitable environment for growth of microbial organisms. Preferably, the chemical makeup of the sewage sludge is: organic material of about 25% by weight; total nitrogen of 1.51% by weight; phosphorous (i.e. in the form $P_2O_5$) of 165 ppm, potassium (i.e. in the form K) of 0.75%, calcium (i.e. in the form Ca) of 5.8% and magnesium (i.e. in the form Mg) of about 1.7% by weight. Other material, such as inorganic material (e.g. sand), may be present in a range of 45% by weight. The sewage sediment has a pH of 7.3.

Table 2 shows an analysis for components of bio-solids compost

| pH | OM % | $P_2O_5$ (ppm) | Ca % | Mg % | K % | Na % | T-N % |
|---|---|---|---|---|---|---|---|
| 7.3 | 32 | 265 | 5.8 | 1.7 | 0.75 | 0.53 | 1.51 |

A pH of soil suitable for a plant growth is in a range of 5.5~8.0 and a pH of the sewage sludge is 7.3, which is suitable for a plant growth.

The sludge cake compost has an organic matter (OM) in a concentration of 32% by weight, which is beneficial to plant growth. Generally, soil having $P_2O_5$ of 200 ppm~300 ppm is classified as soil with a middle level of organic matter. The sewage sludge cake has $P_2O_5$ of 265 ppm, which is suitable for plant growth. In addition, the sewage sludge cake has a good moisture retaining capability.

Table 3 showing an analysis for components of water treatment sediment

| pH | OM % | $P_2O_5$ (ppm) | Ca % | Mg % | K % | Na % | T-N |
|---|---|---|---|---|---|---|---|
| 6.4 | 16.3 | 221 | 4.7 | 1.1 | 0.39 | 0.26 | 0.93 |

An artificial soil is mixed with fermented water treatment sediment in order to control a solid phase. A small particle and large particle are mixed and has good air permeability. A proper amount of the small and large particles are mixed with the materials of the artificial soil to compensate for each characteristic, thereby producing good artificial soil.

Table 4 shows an analysis for components of animal waste

| Material | T-N % | $P_2O_5$ (ppm) | K % | Ca % | Mg % | C/N % | OM % |
|---|---|---|---|---|---|---|---|
| Cow waste | 0.65 | 230 | 0.28 | 3.5 | 2.2 | 17 | 75 |
| Sawdust + cow waste | 0.49 | 271 | 0.54 | 5.3 | 1.5 | 24 | 87 |

Once a saw dust is mixed with an animal waste and fermented, the mixture has an enhanced level of nitrogen and phosphoric acid. The mixture has a high nutrition level, a sufficient organic matter, a good microbe-activating function, and a high latent effect, thereby enhancing the quality of the artificial soil when being mixed with the animal waste.

Table 5 shows an analysis for components of saw dust, bark and wood chip

| Material | pH | OM % | T/N % | Ca % | K % | Mg % | $P_2O_5$ (ppm) | T/C % | C/N % |
|---|---|---|---|---|---|---|---|---|---|
| Saw dust | 5.1 | 87 | 0.23 | 0.85 | 0.25 | 0.15 | 95 | 46.6 | 253 |
| Bark | 5.6 | 92 | 0.28 | 1.20 | 0.18 | 0.21 | 98 | 52.7 | 226 |
| Wood chip | 6.2 | 95 | 0.31 | 0.75 | 0.16 | 0.92 | 165 | 54.1 | 237 |

The saw dust, the bark and wood chop have a weak acidity. There is no problem in an entire pH of the artificial soil since other materials have a pH close to a weak alkalinity. Since the saw dust and the bark contain phosphate and have a great amount of organic matter, they activate aerobic microorganism to be fermented when being mixed with animal waste, etc. They have moisture-retaining capability and perform a nutrient-controlling function when being mixed with the artificial soil.

Table 6 shows physical characteristics of clay

| Diameter (mm) | Moisture retaining amount | Capillary pressure | Moisture and nutrition retaining capability | Adhering force | Air permeability |
|---|---|---|---|---|---|
| 0.002 or less | Very large | Very high | Very high | Very strong | Very poor |

The artificial soil is mixed with clay in order to control the formation of a solid phase, a liquid phase, or a gas liquid phase. A small particle has good moisture retaining capability but has poor air permeability. On the contrary, a large particle has low moisture retaining capability but has good air permeability. A proper amount of the small and large particles are mixed with the materials of the artificial soil to compensate for each characteristic, thereby producing good artificial soil.

A microbe activator (e.g. FRISOL® F), a nutrient for growing a plant, is used. Once the activator FRISOL® F is mixed with soil, the FRISOL® F remains at the soil for a long time without being lost. Accordingly, the activator FRISOL® F has an effect that forest soil is covered with fallen leaves. The activator FRISOL® F is a granular material produced by mixing a microbe that is perished by processing a microbe mass at a temperature of 130° C. with nutrients. Accordingly, the activator FRISOL® F circulates in correspondence with nutrients inside the soil, and supplies the nutrients that can be easily used at a root of a plant by accelerating a complicated microbial operation. The activator FRISOL® F enables the soil to be served as good soil and to have a strong endurance against germ or difficulties.

Table 7 shows an analysis for components of FRISOL F

| OM (%) | N (%) | K (%) | P$_2$O$_5$ (%) | Mg (%) | Fe (ppm) | Zn (ppm) | Cu (ppm) | Mn (ppm) | Na (%) | Cl (%) |
|---|---|---|---|---|---|---|---|---|---|---|
| 72 | 8 | 38 | 430 | 18 | 590 | 25 | 22 | 44 | Less than 1 | Less than 1 |

EXAMPLE 1

Peat in a concentration of 15% by weight was mixed with a fermented sludge cake compost in a concentration of 20% by weight, fermented water treatment sediment in a concentration of 30% by weight, and fermented animal waste in a concentration of 10% by weight, compost wood chips in a concentration of 10% by weight, and compost bark in a concentration of 5% by weight, clay in a concentration of 10% by weight, thereby producing artificial soil. The produced artificial soil has the following components.

Table 8 shows an analysis for components of artificial soil

| PH | OM (%) | P$_2$O$_5$ (ppm) | Ca (%) | Mg (%) | K (%) | Na (%) | T-N (%) |
|---|---|---|---|---|---|---|---|
| 6.2 | 25.8. | 230.5 | 4.58 | 1.39 | 0.35 | 0.19 | 0.75 |

EXAMPLE 2

Fermented sludge cake compost in a concentration of 30% by weight was mixed with fermented water treatment sediment in a concentration of 35% by weight, fermented animal waste in a concentration of 10% by weight, and a woodchip compost in a concentration of 10% by weight and a bark compost in a concentration of 5% by weight and clay in a concentration of 10% by weight, thereby producing artificial soil. The produced artificial soil has the following components.

Table 9 shows an analysis for components of artificial soil

| PH | OM (%) | P$_2$O$_5$ (%) | Ca (%) | Mg (%) | K (%) | Na (%) | T-N (%) |
|---|---|---|---|---|---|---|---|
| 6.0 | 21 | 235.9 | 3.8 | 1.3 | 0.46 | 0.25 | 0.83 |

EXAMPLE 3

Peat in a concentration of 20% by weight was mixed with fermented water treatment sediment in a concentration of 20% by weight, fermented animal waste in a concentration of 20% by weight, a woodchip compost in a concentration of 15% by weight, a bark compost in a concentration of 10% by weight and clay in a concentration of 15% by weight, thereby producing artificial soil. The produced artificial soil has the following components.

Table 10 shows an analysis for components of artificial soil

| PH | OM (%) | P$_2$O$_5$ (%) | Ca (%) | Mg (%) | K (%) | Na (%) | T-N (%) |
|---|---|---|---|---|---|---|---|
| 5.8 | 31.2 | 242 | 4.2 | 1.4 | 0.45 | 0.11 | 0.78 |

EXAMPLE 4

Peat in a concentration of 20% by weight was mixed with a fermented sludge cake compost in a concentration of 30% by weight, fermented animal waste in a concentration of 15% by weight, a woodchip compost in a concentration of 10% by weight, a bark compost in a concentration of 5% by weight and clay in a concentration of 20% by weight, thereby producing artificial soil. The produced artificial soil has the following components.

Table 11 shows an analysis for components of artificial soil

| PH | OM (%) | $P_2O_5$ (%) | Ca (%) | Mg (%) | K (%) | Na (%) | T-N (%) |
|---|---|---|---|---|---|---|---|
| 6.2 | 28 | 251 | 4.7 | 1.5 | 0.46 | 0.19 | 0.69 |

EXAMPLE 5

Peat in a concentration of 20% by weight was mixed with a fermented sludge cake compost in a concentration of 25% by weight, and fermented water treatment sediment in a concentration of 20% by weight, a woodchip compost in a concentration of 15% by weight, a bark compost in a concentration of 10% by weight and loam in a concentration of 10% by weight, thereby producing artificial soil. The produced artificial soil has the following components.

Table 12 shows an analysis for components of artificial soil

| PH | OM (%) | $P_2O_5$ (%) | Ca (%) | Mg (%) | K (%) | Na (%) | T-N (%) |
|---|---|---|---|---|---|---|---|
| 6.5 | 25 | 231 | 4.8 | 1.4 | 0.41 | 0.22 | 1.02 |

EXAMPLE 6

Peat in a concentration of 15% by weight, was mixed with a fermented sludge cake compost in a concentration of 20% by weight, and fermented water treatment sediment in a concentration of 25% by weight and fermented animal waste in a concentration of 20% by weight, a bark compost in a concentration of 5% by weight and loam in a concentration of 15% by weight, thereby producing artificial soil. The produced artificial soil has the following components.

Table 13 shows an analysis for components of artificial soil

| pH | OM (%) | $P_2O_5$ (%) | Ca (%) | Mg (%) | K (%) | Na (%) | T-N (%) |
|---|---|---|---|---|---|---|---|
| 6.1 | 20.8 | 254 | 4.7 | 1.2 | 0.43 | 0.2 | 0.97 |

EXAMPLE 7

Peat in a concentration of 25% by weight was mixed with a fermented sludge cake compost in a concentration of 25% by weight, and fermented water treatment sediment in a concentration of 20% by weight, fermented animal waste in a concentration of 10% by weight, a woodchip compost in a concentration of 10% by weight and clay in a concentration of 10% by weight, thereby producing artificial soil. The produced artificial soil has the following components.

Table 14 shows an analysis for components of artificial soil

| pH | OM (%) | $P_2O_5$ (%) | Ca (%) | Mg (%) | K (%) | Na (%) | T-N (%) |
|---|---|---|---|---|---|---|---|
| 6.5 | 23 | 252 | 5.6 | 1.7 | 0.44 | 0.23 | 1.13 |

EXAMPLE 8

Peat in a concentration of 20% by weight was mixed with a fermented sludge cake compost in a concentration of 30% by weight, and fermented water treatment sediment in a concentration of 15% by weight, and fermented animal waste in a concentration of 15% by weight, a woodchip compost in a concentration of 15% by weight and a bark compost in a concentration of 5% by weight, thereby producing artificial soil. The produced artificial soil has the following components.

Table 15 shows an analysis for components of artificial soil

| PH | OM (%) | $P_2O_5$ (%) | Ca (%) | Mg (%) | K (%) | Na (%) | T-N (%) |
|---|---|---|---|---|---|---|---|
| 6.3 | 28 | 255 | 5.2 | 2.1 | 0.42 | 0.24 | 1.11 |

EXAMPLE 9

Peat in a concentration of 20% by weight was mixed with a fermented sludge cake compost in a concentration of 35% by weight, and fermented water treatment sediment in a concentration of 20% by weight, fermented animal waste in a concentration of 10% by weight, a saw dust compost in a concentration of 15% by weight and thereby producing artificial soil. The produced vegetation base soil has the following components.

Table 16 shows an analysis for components of artificial soil

| PH | OM (%) | $P_2O_5$ (%) | Ca (%) | Mg (%) | K (%) | Na (%) | T-N (%) |
|---|---|---|---|---|---|---|---|
| 6.2 | 24 | 284 | 5.6 | 1.9 | 0.46 | 0.27 | 1.12 |

A PH of soil suitable for a plant growth is in a range of 6 to 8. OM (organic matter) should contain more than 3% but less than 30%; phosphoric acid ($P_2O_5$ in soil suitable for a plant growth is in a range of 100 to 50 ppm.

Calcium (Ca) in soil suitable for a plant growth is in a range of 5 to 7%. Magnesium (Mg) in soil suitable for a plant growth is in a range of 1 to 3%. Potassium (K) in soil suitable for a plant growth is in a range of 1 to 3%. Sodium (Na) in soil suitable for a plant growth is less than 0.3%. Total Nitrogen (T-N) in a soil suitable for a plant growth should be contained more than 0.5%. Above Example 1 through Example 9 for analysis of components of vegetation base soils are all in the suitable range for plant growth.

DETAILED DESCRIPTION OF THE METHOD FOR GROWING VEGETATION ON A SLOPED SURFACE

The method for growing vegetation on a sloped surface using artificial soil according to the present invention will be explained as follows.

(1) The first step is to remove floating stones on a sloped surface, place 2~3 cm diameter of fiber ropes vertically at every 1 m interval on a slope surface along a horizontal direction in order to retain the moisture in the artificial soil a little longer and water the sloped surface until saturation of moisture.

Figure 1:
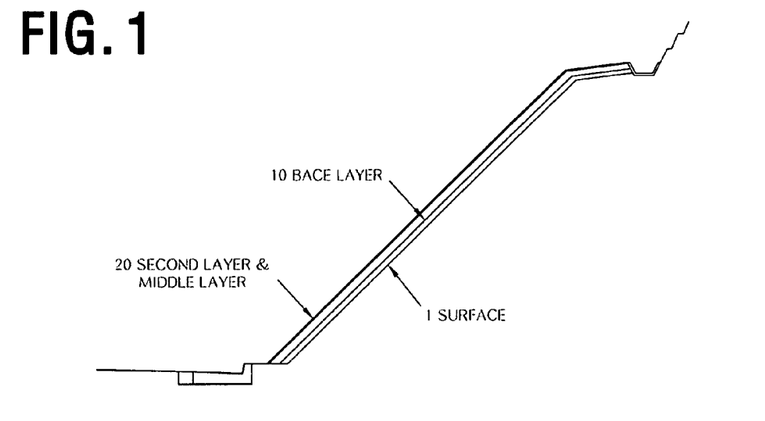
FIG. 1 is a sectional view showing a sloped surface where vegetation base soil of various layers has been applied thereon according to a first embodiment of the present invention.
Figure 2:
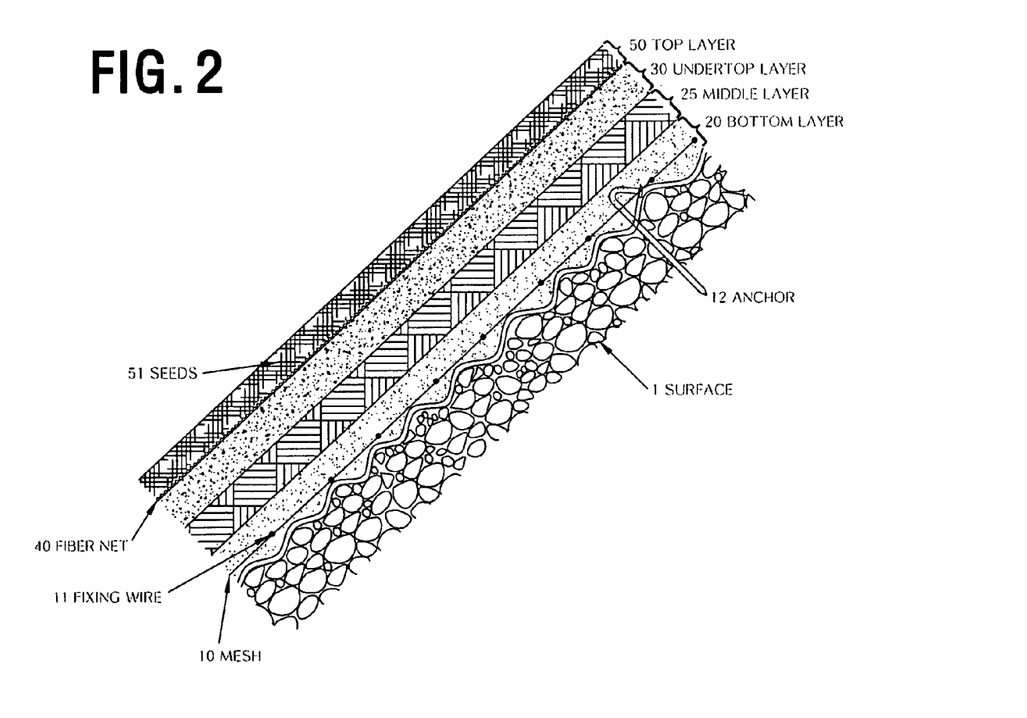
FIG. 2 is a sectional view showing a sloped surface where vegetation base soil has been applied thereon according to the present invention and there are the mesh, the base layer, the second layer, the middle layer and the top layer on the sloped surface.
Figure 3:
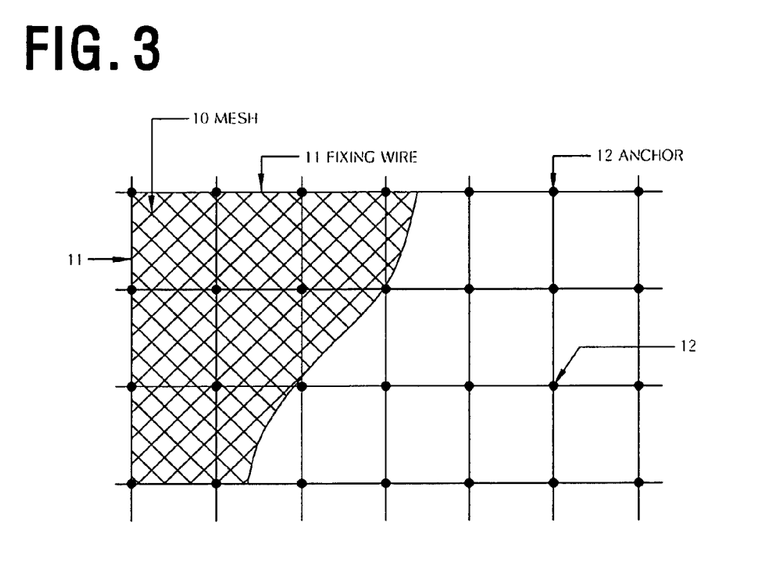
FIG. 3 is an unfolded view of a meshing; fixing wires and anchors according to the present invention.
Figure 4:
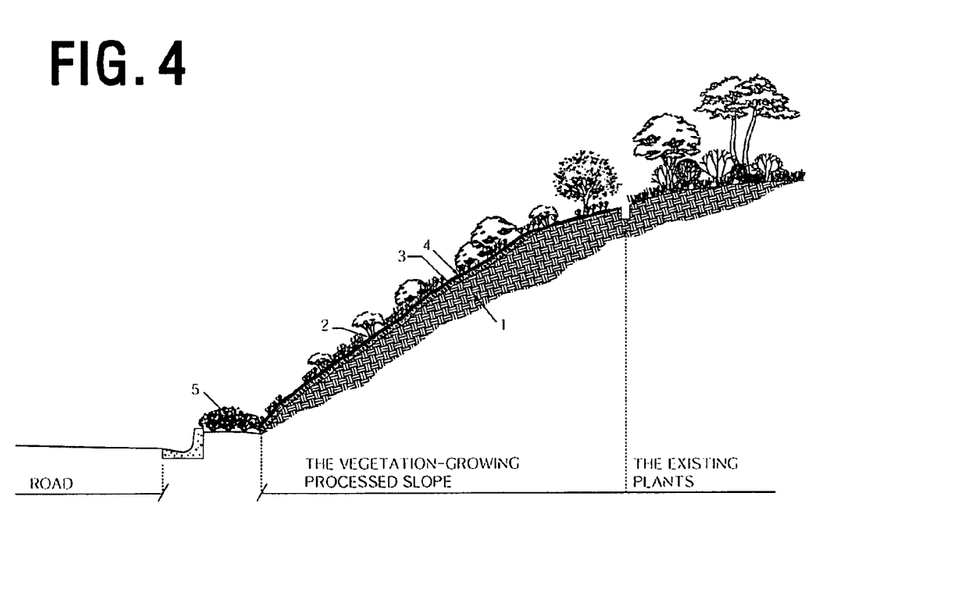
FIG. 4 is a conceptual view of an area that has undergone a process for growing vegetation on a sloped surface using a vegetation base soil according to the present invention.

(2) FIGS. 1 and 2, respectively, show a method for growing vegetation on a sloped surface according to the first embodiment of the present invention. The method for growing vegetation on a sloped surface using artificial soil according to the first embodiment of the present invention, comprises the steps of: installing a mesh 10 formed from a PVC (polyvinyl chloride) coated chain linked fence or a polypropylene mesh on a slope surface 1; forming a bottom layer 20 on the mesh 10 as shown in FIG. 2 by applying the artificial soil mixed with an adhesive material (e.g. FRISOL® S) thereto as shown in FIG. 2; waiting until the vegetation base layer 20 to solidify in order to prevent the vegetation base layer from sliding down; spraying multiple times until the total thickness is larger than 2 inches to prevent the vegetation base soil from sliding down; applying the artificial soil mixed with an adhesive material (e.g. FRISOL® S) as a middle layer 25 in FIG. 2 over the vegetation base layer 20 as shown in FIG. 2 by repeatedly spraying until just it reaches the under-top layer. The under-top layer 30 as shown in FIG. 2 comprises artificial soil mixed with an adhesive material (e.g. FRISOL® S), a root growth activator (e.g. FRISOL® A) and soil microbes activator (e.g. FRISOL® F).

(3) When the slope is steeper than 45 degrees from a horizontal surface and total layer is thicker than 4 inches, a ¼ inch thick fiber net (e.g. coir net) 40 in FIG. 2 will be installed to reinforce the surface.

(4) Top layer 50 as shown in FIG. 2 of the artificial soil is formed by adding a seed mixture and an adhesive material (e.g. FRISOL® S) to prevent moisture evaporation and prevent the layers from sliding down. The seed mixture contains grass seeds, weed seeds and tree seeds added to the artificial soil and sprayed with water by a spraying machine or a pump car.

(5) The reference numeral '51' denotes grass seeds, weed seeds, and tree seeds.

(6) When three months lapsed after the method for growing vegetation on a sloped surface using an artificial soil according to the first embodiment of the present invention has been applied, the grass seeds and the tree seeds sprouted and grew well. The tree seeds grew in harmony with the surrounding environment.

(7) Preferably, the PVC coated wires may form a net having a size of 65 mm×65 mm. Polypropylene mesh having a size of 2 inches×2 inches and a thickness of ¼ inches may also be used. The anchor pin 12 in FIG. 2 has a diameter of 16 mm and a length of 500 mm. Preferably, the bottom layer of 3 cm thickness is formed by using 30 litter of the artificial soil 20 in FIG. 2 and FIG. 2 with 30 g of FRISOL® S, per 1 square meters.

(8) If the total thickness is thicker than 2 inches, multi-layers are required. Preferably, the middle layer of artificial soil 25 in FIG. 2 has a thickness of 3 cm, and the middle layer has the same amount of artificial soil as the bottom layer.

(9) The under-top layer 30 as shown in FIG. 2 will be artificial soil mixed with 30 gram of an adhesive material (e.g. FRISOL® S) and 150 gram of root growth activator (e.g. FRISOL® A) and 300 gram of soil microbes activator (e.g. FRISOL® F) per square meter.

(10) The top layer (final layer) obtained by 20 litter of the artificial soil in 1 square meters of the top layer of 2 cm thick artificial soil 50 with 20 gram of an adhesive material (e.g. FRISOL® S) and 30 gram of seed mix.

The vegetation base soil and the method for growing vegetation on a sloped surface using the vegetation base soil according to the present invention have the following advantages.

When the vegetation base soil is applied to a sloped surface, seeds can sprout fast and vegetation can grow well.

In addition, the vegetation can well grow under a drought condition due to the good moisture and nutrition retaining capability of the vegetation base soil.

Further, the vegetation base soil applied to a sloped surface is in a good harmony with natural environment.

EXAMPLE 10

A further embodiment of the present invention comprises the following steps: removing floating stones from a sloped surface; placing coir ropes of 1 inch diameter vertically at every 1 m interval along a horizontal direction on a slope surface in order to prolong the retention moisture in the artificial soil; watering the sloped surface until saturation of moisture; installing a mesh of polypropylenes of 2×2×¼ inches$^3$ (length×width×thickness) on the surface of the slope, and spraying a bottom layer by applying the artificial soil mixed with an adhesive material (e.g. FRISTOL® S); waiting until the vegetation base layer has solidified to prevent it from sliding down. The thickness of the bottom layer was 1.5 inches. The middle layer (under-top layer) was 1.5 inches thick of artificial soil mixed with an adhesive material (e.g. FRISTOL®S) and a root growth activator (e.g. FRISTOL® A) and a soil microbes activator (e.g. FRISTOL® F).

A 2×2 inches of coir mesh with a thickness of ¼ was installed on a middle layer to reinforce the surface.

Top layer of 1 inch thickness comprises of artificial soil mixed with a seed mixture and an adhesive material (e.g. FRISTOL® S). The seed mixture contains a grass seeds, weed seeds and tree seeds sprayed with water by a spraying pump car.

Three months after application of the above method, the barren surface was changed to a vegetating slope.

EXAMPLE 11

Test for Sediment Runoff

The test was performed on May 16, 2009 and the research continued through Jul. 30, 2009. The following result had been obtained under the condition of rainfall of more than 30 mm at one time. During research, six (6) times precipitation more than 30 mm at one time were recorded and, in one instance, the precipitation was 267 mm.

Table 4.6 Shows Muddy Sediment Runoff of the Test Segments 1 and 2 are Much Less than the Control Segment.

TABLE 4.6

Muddy Sediment Runoff After NockSanSoil Spraying on a Slope
Muddy Sediment Runoff (g/m$^3$)
2009

| | Date | | | | | |
|---|---|---|---|---|---|---|
| | May 16 | May 21 | June 22 | June 29 | July 7~July 12 | July 14~July 21 |
| Precipitation (mm) | 34.5 | 43.5 | 55.5 | 82.5 | 134 | 267 |

TABLE 4.6-continued

Muddy Sediment Runoff After NockSanSoil Spraying on a Slope
Muddy Sediment Runoff (g/m³)

| | 2009 Date | | | | | |
|---|---|---|---|---|---|---|
| | May 16 | May 21 | June 22 | June 29 | July 7~July 12 | July 14~July 21 |
| Control sector (g/m³) | 15.7 | 72.04 | 129.48 | 237.32 | 619.10 | 1118.97 |
| Test Sector 1 (g/m³) | 5.26 | 12.60 | 9.89 | 36.65 | 34.00 | 79.61 |
| Test Sector 2 (g/m³) | 5.07 | 10.45 | 8.01 | 30.66 | 32.12 | 59.17 |

There is no other sediment than mud. In addition, after the slope surfaces are covered by vegetation, there is no sediment runoff.

EXAMPLE 12

Monitoring Data

This monitoring data is a typical set of data among a large amount of data.
(1) Vegetation on Road Side Slopes in Yongin-Heungduck Project of Korea Land Corporation
Outline of the Site The vegetation work on the slope in the site was conducted from May 25 to Sep. 30, 2007. The relevant research was conducted by selecting randomly the researched areas from the working site.

The vegetation work for research area 1 was completed on May 26, 2007 and the vegetation work for research area 2 was completed on Jun. 12, 2007. The monitoring research was conducted twice—Apr. 28, 2008 and Jul. 25, 2008. The monitoring research is continually conducted.
The soil of the slope area consists of weathered rock and blasted rock.

CHART 1

Outline of the site in the district of Yongin-Heungduck

| project | Vegetation on Road side in the Yongin-Heungduck district | | |
|---|---|---|---|
| location | YongIn city KyungKi Province Korea | | |
| Administrator | Korea Land Corporation | Contractor | TransCorea Dev. Co. Ltd |
| Amount | 722,700,000 kor · won | area | 10,495 m² weathered rock |
| | | | 19,958 m² blasted rock |
| applying method | Frisol NockSanSoil Vegetating | Thickness | Thk: 5 cm, Thk: 10 cm, |

CHART 2

Site condition

| geography | location | Yong In City, KyungKi Province, Korea |
|---|---|---|
| | direction | north slopes/south slopes |
| | slope angle | 1:0.7~1:0.5 |
| | slope height | 5~40 m |
| soil condition | hardness (mm) | 28~33 mm |
| | pH | 5.5~6.3 |

CHART 2-continued

Site condition

| surface shape | erosion | N/A |
|---|---|---|
| hydrogeology | spring out | N/A |
| | drainage | shoulder ditch |
| plants | surroundings | maple tree, *betula platyphylla* var. *japonica*, *quercus aliena*, *lepedeza bicolor*, *pinus densiflola*, etc. |
| climate | monthly precipitation 1) | 08.04.28  120 · mm |
| | | 08.07.25  540 · mm |
| | yearly precipitation | 1,238.3 mm (2007.05~2007.09) |

CHART 3

Seed mix data

| | | cut rock slopes | | |
|---|---|---|---|---|
| classification | Item | qty (g/m²) | rate (%) | RM |
| traditional woody plant | *pinus densiflola* | 1 | 3 | |
| | *albizia julibulison* | 2 | 7 | |
| | *lespedeza cytrobotrya* | 3 | 10 | |
| | *indigofera pseodotingtoria* | 1 | 3 | |
| | sub total | 7 | 23 | |
| traditional grass | *lespedeza cuneata* | 4 | 13 | |
| | *arundinella hirta* | 2 | 7 | |
| | *lotus corniculatus* | 5 | 17 | |
| | *aster yomena* | 2 | 7 | |
| | *dianthus chinensis* | 3 | 10 | |
| | sub total | 16 | 53 | |
| imported grass | tall *fescue* | 2.5 | 8 | Turf type |
| | perennial rygrass | 2.5 | 8 | |
| | kenturky blue grass | 2 | 7 | |
| | sub total | 7 | 23 | |
| | Total | 30 | 100 | |

The Measuring Result of Soil Hardness, PH, and Moisture

The measurement was calculated by the average value of the four (4) points selected randomly. As a result, the hardness of the area is suitable for growing the plant as indicated in the Chart 4.

CHART 4 research result of soil hardness

| | | | soil hardness (mm) by checking spot | | | | | |
|---|---|---|---|---|---|---|---|---|
| research district | worked date | research date | spot 1 | spot 2 | spot 3 | spot 4 | spot 5 | average |
| district 1 | May 26, 2007 | Apr. 28, 2008 | 20 | 21 | 18 | 22 | 21 | 20 |
| district 2 | Jun. 12, 2007 | | 19 | 19 | 20 | 17 | 20 | 19 |
| district 1 | May 26, 2007 | Jul. 25, 2008 | 18 | 17 | 17 | 20 | 16 | 17 |
| district 2 | Jun. 12, 2007 | | 21 | 22 | 19 | 16 | 19 | 19 |

Regarding the PH of soil, the research area 1 was pH 6.60, and research area 2 was pH 6.56 on Apr. 28, 2008. In the research on Jul. 25, 2008, the research area 1 was pH 6.30, and the research area 2 was pH 6.08. Accordingly, there was no problem in growing the plant in this area (see the Chart 5).

CHART 5 research result of soil PH

| | | | soil pH by checking spot | | | | | |
|---|---|---|---|---|---|---|---|---|
| research district | worked date | research date | spot 1 | spot 2 | spot 3 | spot 4 | spot 5 | average |
| district 1 | May 26, 2007 | Apr. 28, 2008 | 6.7 | 6.9 | 6.3 | 6.6 | 6.5 | 6.60 |
| district 2 | Jun. 12, 2007 | | 6.3 | 6.8 | 6.4 | 6.7 | 6.6 | 6.56 |
| district 2 | May 26, 2007 | Jul. 25, 2008 | 6.3 | 6.2 | 6.0 | 6.4 | 6.6 | 6.30 |
| district 1 | Jun. 12, 2007 | | 5.9 | 6.2 | 6.1 | 6.2 | 6.0 | 6.08 |

CHART 6 research result of soil moisture

| | | soil moisture (%) by checking spot | | | | | |
|---|---|---|---|---|---|---|---|
| research district | research date | spot 1 | spot 2 | spot 3 | spot 4 | spot 5 | average |
| control 1 | Jul. 25, 2008 | 6.3 | 5.2 | 5.9 | 5.8 | 6.2 | 5.8 |
| control 2 | | 5.7 | 5.7 | 6.3 | 6.7 | 5.4 | 5.9 |
| district 1 | | 32 | 33 | 28 | 26 | 23 | 28.4 |
| district 2 | | 26 | 28 | 23 | 30 | 36 | 28.6 |

The Research Result of Germination Number

The germination number of the plant means the individual number from the germination to growth. Accordingly, the research for germination number is to measure how many plants grow, compared with the amount of seeding. In general, the more germinating is the more useful for planting on the slope surface.

The measurement of the 5 points randomly selected was conducted by using Square form (25×25 cm). The average value of the 5 points was very good as indicated by Chart 7.

CHART 7 research result of plants germination

| | | | germination number (plants/m$^2$) by checking spot | | | | | |
|---|---|---|---|---|---|---|---|---|
| research district | worked date | research date | spot 1 | spot 2 | spot 3 | spot 4 | spot 5 | average |
| district 1 | May 26, 2007 | Apr. 28, 2008 | 400 | 432 | 400 | 496 | 480 | 441 |
| district 2 | Jun. 12, 2007 | | 496 | 464 | 480 | 496 | 432 | 473 |
| district 2 | May 26, 2007 | Jul. 25, 2008 | 512 | 528 | 512 | 496 | 528 | 515 |
| district 1 | Jun. 12, 2007 | | 544 | 560 | 528 | 528 | 544 | 540 |

The Research Result of Plant's Height

The Plant's height means the height of plant after germination. The research was conducted by selecting species of the seeds with the highest number of germinated plants. The result was satisfactory as indicated by Charts 8 and 9.

CHART 8 plant's height of research district 1

| | | | plant's height (cm) by checking spot | | | | | |
|---|---|---|---|---|---|---|---|---|
| research district | item | research date | spot 1 | spot 2 | spot 3 | spot 4 | spot 5 | average |
| district 1 | lotus corniculatus | Apr. 28, 2008 | 21 | 17 | 19 | 18 | 20 | 19 |
| | dianthus chinensis | | 48 | 55 | 51 | 42 | 49 | 49 |
| | albizia juliburison | Jul. 25, 2008 | 145 | 120 | 123 | 150 | 155 | 138 |
| | lespedeza cyrtobotrya | | 87 | 95 | 97 | 90 | 105 | 94 |

CHART 9 plant's height of research district 2

| | | | plant's height (cm) by checking spot | | | | | |
|---|---|---|---|---|---|---|---|---|
| research district | item | research date | spot 1 | spot 2 | spot 3 | spot 4 | spot 5 | average |
| district 2 | lotus corniculatus | Apr. 28, 2008 | 32 | 30 | 22 | 21 | 29 | 26 |
| | dianthus chinensis | | 41 | 33 | 30 | 38 | 36 | 35 |
| | albizia juliburison | Jul. 25, 2008 | 126 | 119 | 135 | 121 | 138 | 127 |
| | lespedeza cyrtobotrya | | 98 | 100 | 95 | 90 | 93 | 95 |

The Research Result of Covering Ratio

The covering ratio means the rate of the space where the plants cover after growing. Therefore, the high of covering ratio indicates the flourishing of plant's growing, and the law of covering ratio, the weak of plant's growing.

According to the Manual published in 2005 by Ministry of Construction and Transportation, the covering ratio is 70-80% if one sees the green color when seeing the planting area in about 10 meters before the area. The covering ratio was good as indicated by Chart 10 and Pictures 2, 4 and 5.

CHART 10 research results of covered rate

| | | covered rate (%) | |
|---|---|---|---|
| worked date | research date | research district 1 | research district 2 |
| Jul. 05, 1926 | Aug. 04, 1928 | 85 | 85 |
| Jul. 06, 1912 | Aug. 07, 1925 | 90 | 90 |

The Research Result of Appearance Plants

This research was analyzed by using the data obtained on Apr. 28, 2008. In the case of Traditional Plants, *Lepedeza bicolor, Indigopera pseudotinctoria Albizia juliblison, Lepedeza cuneata, Arundinella Hirta, Lotus corniculatus* var. *japonica regel, Diantus chinensis L.* var. *chinenesis.* etc. were well growing. In the case of Imported grass, Tall fescue, Perennial rygrass, and Kenturky blue grass were well growing (see Chart 11). In addition, nine (9) kinds of invading plants were found.

CHART 11 research for plants appearance

| research district | vegetated plant's species | |
|---|---|---|
| | seeded species | invaded species |
| all districts | lespedeza cyrtobotrya<br>pinus densiflora<br>indigofera pseudotinctoria<br>albizia juliburison<br>lespedeza cuneata<br>arundinella hirta<br>lotus corniculatus<br>aster yomena<br>dianthus chinensis<br>tall fescue<br>perennial rygrass<br>kenturky blue grass | humulus japoincus<br>artemisia princeps<br>digitaria sanguinalis<br>setaria viridis<br>lactuca indica<br>alnus hirsuta |

Conclusion

The monitoring data can be summarized as follows:
1) The average of soil hardness was 17 mm in the research area 1 and 19 mm in the research area
2. The average of soil PH was 6.30 in the research area 1 and pH 6.08 in the research area 2. The average of soil moisture was 28.4% in the research area and 28.6% in the control area. These are all the good results for the plant's growth.
2) Regarding the germination number, the average germination number, in the research area 1 was 515 plants per square meter and that in the research area 2, it was 540 plans per square meter. These are also good results.
3) The research result of Plant's height is as follows: In the case of flowering herbs in the research area 1, *Lotus cornicuratus* var. *japonica regel*, was 19 cm; and *Diantus chinensis L.* var. *chinenesis*, 49 cm. In the case of woody plants in the research area 1, *Lepedeza bicolor* was 138 cm; and *Lepedeza bicolor*, 94 cm. In the research area 2, *Lotus cornicuratus* var. *japonica regel* was 26 cm; *Diantus chinensis L.* var. *chinenesis*, 35 cm; *Lepedeza bicolor*, 127 cm; and *Lepedeza bicolor*, 95 cm. These are also good results.
4) The covering ratio was good by showing more than 90% in the research area 1 and 2.
5) Regarding the appearance plants, all the plants among 12 seeding plants were germinated. Their growth was also good. In addition, 7 kinds of invading plants, such as *Lactuca indica* var. *laciniata, Erigeron annuus, Humulus japonicus, Alunus hirsuta*, etc., were found.

Opinion on the Monitoring

These sites show the good growth and prospect. In addition, these areas are harmonized with the surround areas. Further, these areas are shaped as a multi-height plants community because lawn, flowering herbs, and woody plants are all growing well.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of growing vegetation on a sloped surface using a vegetation base soil comprising the steps of:
    affixing a mesh over the sloped surface; and
    applying the vegetation base soil mixed with plant seeds onto the mesh;
wherein the vegetation base soil comprising
(a) about 5 to 35% weight percent of peat;
(b) about 10 to 39% weight percent of a sludge cake compost;
(c) about 10 to 40% weight percent of water treatment sediment that is dewatered;
(d) about 10 to 35% weight percent of an animal waste compost;
(e) about 10 to 30% weight percent of a wood chip compost;
(f) about 5 to 20% weight percent of a bark compost; and
(g) about 5 to 30% weight percent of clay or loam.

2. The method of claim 1, further comprising the steps of:
    installing fiber ropes of 2-3 cm diameters along a horizontal direction of the sloped surface to prolong retention of moisture in the vegetation base soil; and
    watering the sloped surface until saturation of moisture.

3. The method of claim 1, further comprising the steps of:
    applying onto the mesh vegetation base soil mixed with a microbes activator and an adhesive material; a root growth activator; and clean water.

4. The method of claim 1, wherein the sloped surface is steeper than 45 degree from a horizontal surface; the total thickness of the vegetation base soil is thicker than two inches; and the vegetation base soil comprises more than two layers.

5. The method of claim 1, wherein vegetation base soil mixed with plant seeds is applied onto the mesh by using a spraying device or pump car.

* * * * *